(12) United States Patent
Patil

(10) Patent No.: US 8,479,038 B1
(45) Date of Patent: *Jul. 2, 2013

(54) METHOD AND APPARATUS FOR ACHIEVING HIGH AVAILABILITY FOR APPLICATIONS AND OPTIMIZING POWER CONSUMPTION WITHIN A DATACENTER

(75) Inventor: Roshni Jaywantsingh Patil, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/299,706

(22) Filed: Nov. 18, 2011

Related U.S. Application Data

(63) Continuation of application No. 12/396,999, filed on Mar. 3, 2009, now Pat. No. 8,065,560.

(51) Int. Cl.
*G06F 11/00* (2006.01)

(52) U.S. Cl.
USPC .............. 714/4.2; 714/14; 718/104; 718/105

(58) Field of Classification Search
None
See application file for complete search history.

(56) References Cited

U.S. PATENT DOCUMENTS

| 7,401,248 B2 * | 7/2008 | Nakahara et al. ............... 714/4.1 |
| 2005/0193227 A1 * | 9/2005 | Nakahara et al. ................. 714/4 |
| 2006/0015773 A1 * | 1/2006 | Singh et al. .................... 714/13 |
| 2010/0106990 A1 * | 4/2010 | Kalman ........................ 713/323 |
| 2010/0107172 A1 * | 4/2010 | Calinescu et al. ............ 718/104 |

\* cited by examiner

*Primary Examiner* — Christopher McCarthy
(74) *Attorney, Agent, or Firm* — Campbell Stephenson LLP

(57) ABSTRACT

A method and apparatus for achieving high availability for applications and optimizing power consumption within a datacenter is provided. In one embodiment, a method for providing high availability and optimizing power consumption within a datacenter comprises upon execution of an application at a target node amongst a plurality of nodes in a datacenter, selecting a failover target node amongst the plurality of nodes for the application, and reserving a failover capacity of at least one resource of the selected failover target node.

20 Claims, 3 Drawing Sheets

METHOD AND APPARATUS FOR ACHIEVING HIGH AVAILABILITY FOR APPLICATIONS AND OPTIMIZING POWER CONSUMPTION WITHIN A DATACENTER

CROSS-REFERENCE TO RELATED APPLICATIONS

The present patent application is a continuation of U.S. patent application Ser. No. 12/396,999, filed on Mar. 3, 2009, now U.S. Pat. No. 8,065,560 entitled "Method and Apparatus for Achieving High Availability for Applications and Optimizing Power Consumption within a Datacenter" and is incorporated by reference herein in its entirety and for all purposes as if completely and fully set forth herein.

BACKGROUND

1. Field of the Invention

Embodiments of the present invention generally relate to datacenter workload management and high availability systems and, more particularly, to a method and apparatus for achieving high availability for applications and optimizing power consumption within a datacenter.

2. Description of the Related Art

In a typical computing environment (e.g., a datacenter), one or more computers host one or more mission critical applications that need to be highly available. For example, certain mission critical applications are required to be online in order to maintain computer security, prevent confidential data leakage and/or detect malicious software programs. Generally, a computer is selected amongst the one or more available computers as a target computer that hosts the mission critical applications. In order achieve high availability for the mission critical applications, each and every computer in the datacenter remains in a standby mode or powered on. The computers are not utilized to host the mission critical applications until the target computer faults and/or fails. As a result, the other computers remain powered on and consequently, a significant amount of power is dissipated.

Currently, various power management techniques are utilized to identify and power off the one or more computers that do not host any of the mission critical applications. However, such power management techniques fail to identify the failover computer and power off that as well. Further, during a failover, starting a powered off computer takes considerable time. Furthermore, probing resources may consume additional time that may not be acceptable for the one or more mission critical applications. Consequently, a failover time is high that may not be acceptable for the one or more mission critical applications that needs to be highly available. Moreover, the mission critical applications are not available until the one or more failover computers are powered on.

Therefore, there is a need in the art for a method and apparatus for achieving high availability for applications and optimizing power consumption within a datacenter.

SUMMARY OF THE INVENTION

Embodiments of the present invention comprise a method and apparatus for achieving high availability for applications and optimizing power consumption within a datacenter. In one embodiment, a method for providing high availability and optimizing power consumption within a datacenter comprises upon execution of an application at a target node amongst a plurality of nodes in a datacenter, selecting a failover target node amongst the plurality of nodes for the application, and reserving a failover capacity of at least one resource of the selected failover target node.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
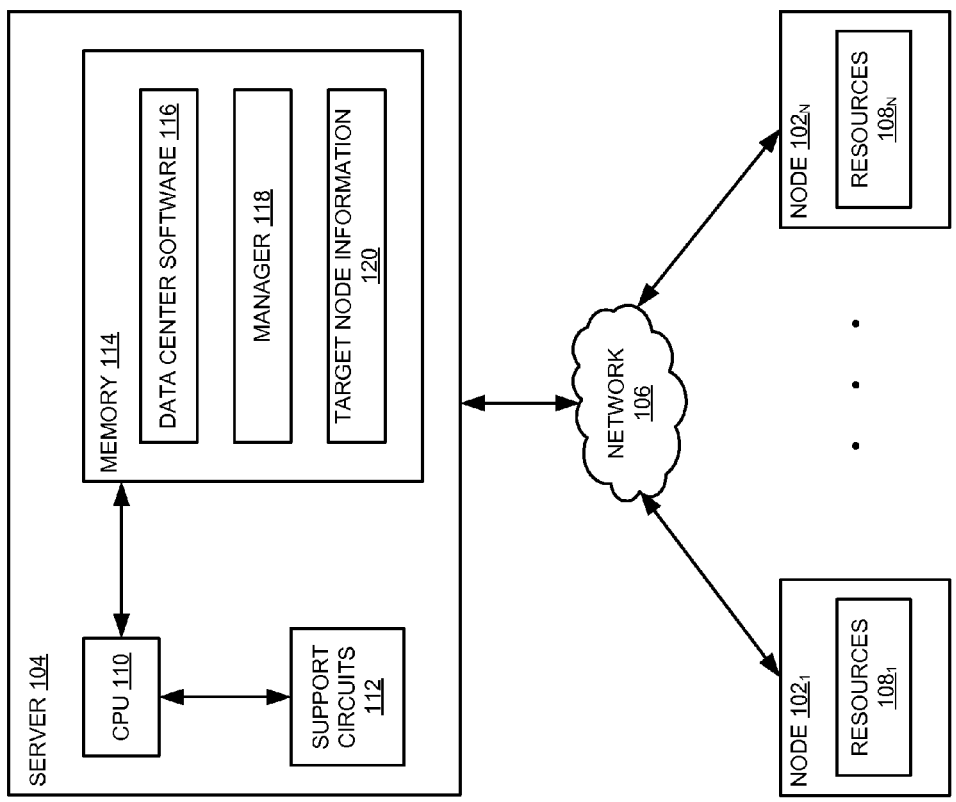
FIG. 1 is a block diagram of a system for achieving high availability for applications and optimizing power consumption within a datacenter according to various embodiments of the invention.

FIG. 1 is a block diagram of a system 100 for achieving high availability for applications and optimizing power consumption within a datacenter according to one embodiment. The system 100 comprises a server 104 and a plurality of nodes 102 (illustrated as a node $102_1$ ... a node $102_N$) where each is coupled to the server 104 through a network 106.

The server 104 is a type of computing device (e.g., a laptop, a desktop, a Personal Digital Assistant (PDA) and/or the like), such as those generally known in the art. The server 104 includes a Central Processing Unit (CPU) 110, various support circuits 112 and a memory 114. The CPU 110 may comprise one or more commercially available microprocessors or microcontrollers that facilitate data processing and storage. The various support circuits 112 facilitate the operation of the CPU 110 and include one or more clock circuits, power supplies, cache, input/output circuits and/or the like. The memory 114 comprises at least one of Read Only Memory (ROM), Random Access Memory (RAM), disk drive storage, optical storage, removable storage and/or the like. The memory 114 includes various data, such as target node information 120. Further, the memory 114 includes various software packages, such as datacenter software 116 and a manager 118.

The network 106 comprises a communication system that connects computers by wire, cable, fiber optic and/or wireless link facilitated by various types of well-known network elements, such as hubs, switches, routers, and the like. The network 106 may employ various well-known protocols to communicate information amongst the network resources. For example, the network 106 may be a part of the internet or intranet using various communications infrastructure, such as Ethernet, WiFi, WiMax, General Packet Radio Service (GPRS), and the like. Furthermore, the network 106 may form a portion of a Storage Network Area (SAN) using various communications infrastructure, such as Ethernet, Fibre Channel, InfiniBand, Internet Small Computer System Interface (iSCSI) and the like.

The nodes 102 may include various types of physical and/or virtual computing devices (e.g., a laptop, a virtual machine, a desktop, a Personal Digital Assistant (PDA) and/or the like), such as those generally known in the art. The plurality of nodes 102 are configured to provide high availability of one or more applications. The nodes 102 may include nodes in a standby state as well as nodes in a running state. According to various embodiments, the nodes 102 include various resources 108 (illustrated as resources $108_1 \ldots$ resources $108_N$).

In one embodiment, the resources 108 include various computing resources, such as hardware (e.g., processors, computer memory, network devices, data storage devices and/or the like) and/or software (e.g., processes, applications and/or the like), that are accessible by the plurality of nodes 102. As such, the resources 108 are utilized by the plurality of the nodes 102 to host the one or more applications and achieve high availability. According to various embodiments, the resources 108 may include available data storage space (e.g., RAM), processing power (e.g., CPU cycles), available network bandwidth and/or the like.

Generally, the datacenter software 116 includes software code that is configured to monitor the nodes 102. In one embodiment, the datacenter software 116 monitors a state associated with each node of the nodes 102 as well as a capacity associated with each resource of the resources 108. In one embodiment, the datacenter software 116 monitors system health associated with the target node and/or the failover target node. Furthermore, the datacenter software 116 employs various target node selection algorithms, such as a best fit algorithm and/or the like.

In addition, the datacenter software 116 may be configured to aggregate and update the target node information 120. In one embodiment, the target node information 120 defines capacities for the resources 108 and loads for one or more applications (e.g., online and/or offline applications). For example, the target node information 120 may indicate available network bandwidth, memory and/or processing power. Furthermore, the target node information 120 may indicate a number of online applications at each node of the nodes 102.

According to various embodiments, the CPU 110 executes the datacenter software 116 stored in the memory 114 to examine the target node information 120 and select a target node amongst the nodes 102 for an application. For example, the datacenter software 116 processes the target node information 120 to assess capacities of the resources 108 on the nodes 102. Then, the datacenter software 116 compares a required application load to the available capacities of the resources 108 to identify the target node where an application is to be executed (i.e., brought online). After the target node is identified, the application is brought online.

The manager 118 includes software code configured to reserve a failover capacity for an application at a failover target node and conserve power consumption amongst the nodes 102 according to one or more embodiments. Furthermore, the failover target node is in a running state in order to provide high availability for the application. The CPU 110 executes the manager 118 stored in the memory 114 in order to select the failover target node amongst the nodes 102 upon execution of the application at the target node. In operation, the manager 118 selects the failover target node and reserves the failover capacity as the application is brought online at the target node. According to one or more embodiments, the manager 118 utilizes one or more algorithms (e.g., best fit algorithm) to select the failover target node. In one or more embodiments, the manager 118 determines and processes a priority and/or compatibility of the application on the failover target node while reserving the failover capacity.

According to various embodiments, the manager 118 determines a failover capacity based on the target node information 120. For example, the manager 118 reserves the failover capacity that is equal to a required application load (i.e., a maximum load) and does not exceed an available capacity at the failover target node. Alternatively, the manager 118 does not reserve a failover capacity for an application having a priority below a pre-defined threshold if a node (e.g., a powered off host computer) is to be brought to a running state (e.g., powered on) as a result. Thus, the manager 118 maintains a maximum number of nodes in a powered off state.

In one embodiment, the manager 118 reserves a failover capacity without disrupting any lower priority application. For example, the manager 118 selects a failover target node in which reserving the failover capacity does not force one or more lower priority applications offline. Alternatively, the manager 118 may disregard a lower priority application having a priority below a pre-defined threshold. For example, the manager 118 may reserve the failover capacity even though the failover target node cannot accommodate a capacity of a lowest priority application as long as a node does not have to be powered on (i.e., no running computer has a sufficient capacity for the required application load).

In one embodiment, the manager 118 cooperates with the datacenter software 116 to optimize power consumption by the nodes 102. In one embodiment, the manager 118 examines the target node information 120 to identify one or more nodes of the nodes 102 that are not selected to be target nodes and failover targets. As such, the identified one or more nodes are not providing application services or participating in a failover process. Hence, the identified one or more nodes are not needed to achieve high availability for the application at the target node. Accordingly, the identified one or more nodes may be powered off or brought into a standby state.

In one embodiment, a user may configure the manager 118 such that the applications are categorized as a critical application and/or a non-critical application. As such, in one embodiment, the manager 118 always reserves the failover capacity for the critical application. In another embodiment, the user configures the manager 118 based on a threshold value. The threshold value is utilized to determine the failover capacity to be reserved. For example, the user configures the manager 118 to reserve 50% of the failover capacity and the application load is 1000, then only 500 is reserved as the failover capacity.

As mentioned above, the failover target node includes one or more online lower priority applications. According to various embodiments, the manager 118 reserves the failover capacity such that the one or more online lower priority applications do not need to be brought offline. The manager 118 is configured to reserve the failover capacity based on the priority of the application to be brought online. The user may configure the manager 118 such that a longer failover time is acceptable for an application having a priority below a pre-defined threshold in order to achieve high availability for higher priority applications In one or more embodiments, the datacenter software 116 monitors the nodes 102 to detect a fault or a failure that affects an application (e.g., an online application). In order to achieve high availability, the datacenter software 116 performs a failover process to continue operating the application. During the failover process, the datacenter software 116 instructs the target node to offline the application. Then, the datacenter software 116 migrates the application from the target node to the failover target node. The application is brought online immediately because the failover capacity is already reserved. As of this point, the failover target node becomes the target node. Subsequently, the manager 118 selects another failover target node amongst the nodes 102. In one embodiment, the manager 116 examines the target node information 120 to select the other failover target node as a replacement for the failover target node after the failover process.

In another embodiment, the manager 118 reevaluates the target node information 120 and selects the other failover target node when the failover target node faults and/or is not accessible. For example, if the manager 118 does not receive a heartbeat from the failover target node, then the manager 118 selects the other failover target to replace the failover target node. In yet another embodiment, the manager 118 replaces the failover target node when a previously faulted node starts operating normally and may be used as a potential failover target node.

In another embodiment, the datacenter software 116 and the manager 118 cooperate to consolidate reserved and/or failover capacities associated with online applications in order to power down unused nodes (e.g., host computers). When an offline application is detected, the datacenter software 116 releases a reserved capacity at a target node and a reserved failover capacity at a failover target node. Then, the manager 118 consolidates released capacities to identify the unused nodes and optimize power consumption. In one embodiment, the datacenter software 116 instructs the unused nodes to power down.

Subsequently, the manager 118 reevaluates the nodes 102 for failover target node selection and failover capacity reservation. In one embodiment, the manager 118 consolidates failover capacities associated with one or more online applications. For example, the manager 118 modifies failover capacity reservations associated with the one or more online applications in order to free up a node (e.g., a host computer) amongst the nodes 102, which is powered down to conserve power. As another example, the manager 118 determines one or more online applications that may be migrated to the target node from the failover node, which frees up the failover target node. As such, the failover target node is powered off to conserve power.

According to various embodiments, the system 100 is a datacenter that includes a virtual environment where the nodes 102 are virtual machines hosted on a plurality of host computers. As an example and not as a limitation, the datacenter software 116 utilizes various features supported by the virtual environment (e.g., Live Migration for VERITAS Cluster Server One) to migrate an online application (e.g., a service group) from one node to another node amongst the nodes 102 without initially offlining the application, which enables uninterrupted online application operations and zero failover time.

Figure 2:
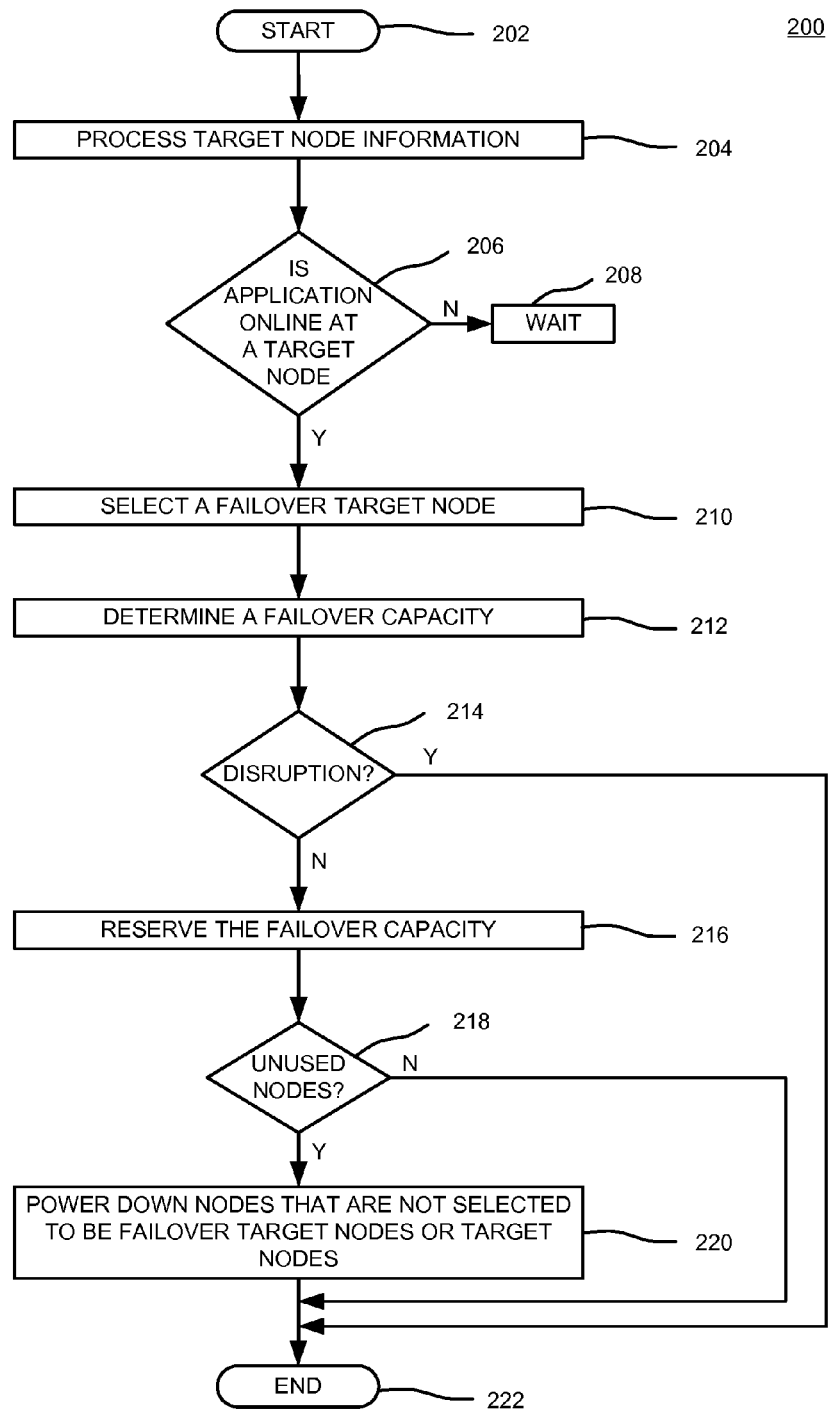
FIG. 2 is a block diagram of a method for achieving high availability for applications and optimizing power consumption within a datacenter according to various embodiments of the invention.

FIG. 2 is a block diagram of a method 200 for achieving high availability for applications and optimizing power consumption within a datacenter according to one embodiment. The method 200 starts at step 202 and proceeds to step 204, at which target node information (e.g., the target node information 120 of FIG. 1) is processed.

At step 206, a determination is made as to whether an application is online at a target node. If, it is determined that the application is not online at the target node (option "NO") then the method 200 proceeds to step 208. At step 208, the method 200 waits until the application is brought online at the target node. If, at step 206, it is determined that the application is online at the target node (option "YES") then the method 200 proceeds to step 210. At step 210, a failover target node is selected. In one embodiment, the failover target node is selected from the plurality of nodes (e.g., the nodes 102 of FIG. 1).

At step 212, a failover capacity is determined. As described above, the failover capacity may be equal to an application load. At step 214, a determination is made as to whether there is a disruption at the failover target node. For example, the failover target node is disrupted if reserving the failover capacity may force one or more lower priority applications offline. If, it is determined that there is a disruption (option "YES"), then the method 200 proceeds to step 222. If, at step 214, it is determined that there is no disruption (option "NO") then the method 200 proceeds to step 216. At step 216, the failover capacity is reserved. At step 218, a determination is made as to whether there are unused nodes. If, it is determined that there are no unused nodes (option "NO") then the method 200 proceeds to step 222. If, at step 218, it is determined that there are unused nodes (option "YES") then the method 200 proceeds to step 220. At step 220, the nodes that are not selected to be failover target nodes or target nodes are powered down. The method 200 proceeds to step 222, where the method 200 ends.

Figure 3:
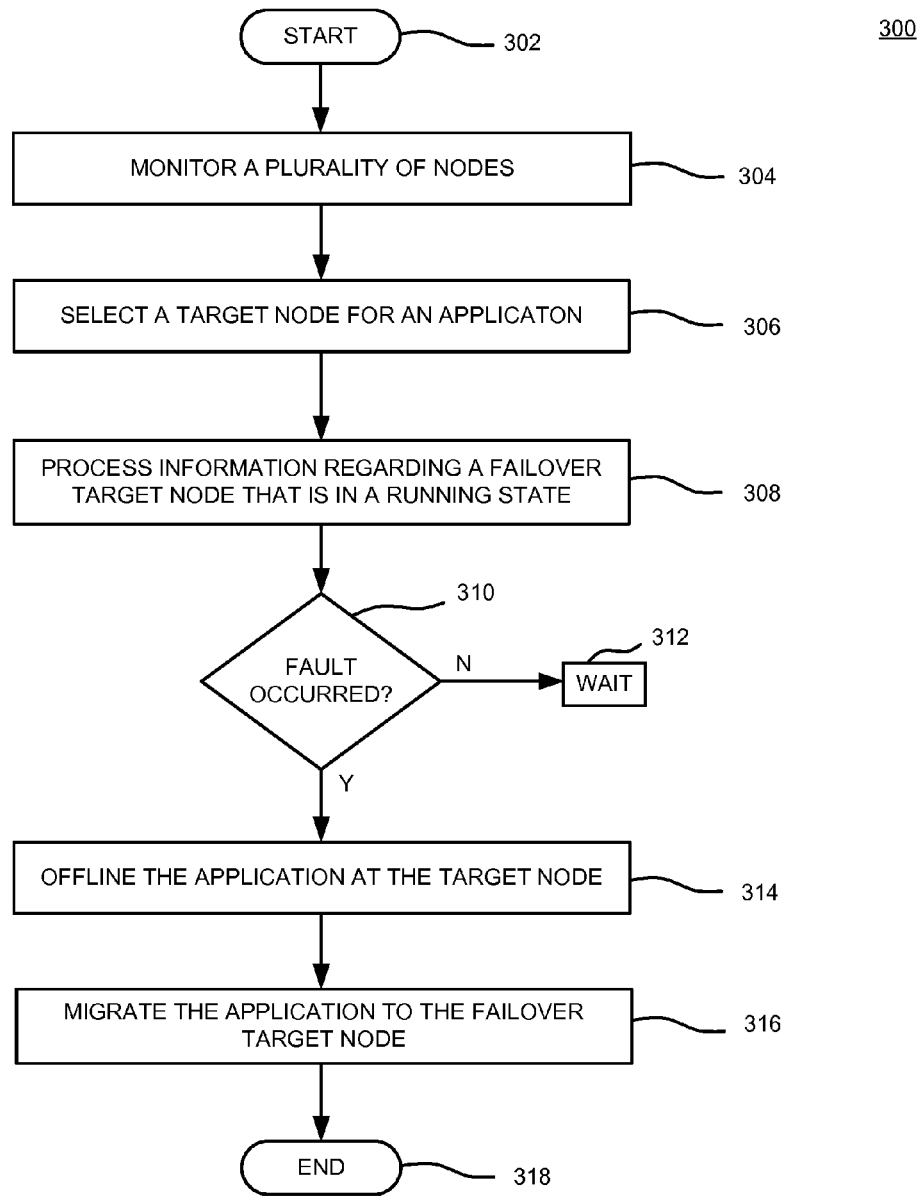
FIG. 3 is a block diagram of a method for failing over an application to a failover target node according to various embodiments of the invention.

FIG. 3 is a block diagram of a method 300 for failing over an application to a failover target node according to one embodiment. The method 300 starts at step 302 and proceeds to step 304, at which a plurality of nodes (e.g., the nodes 102 of FIG. 1) are monitored.

At step 306, a target node for an application is selected. As explained above, the application is brought online at the target node. At step 308, information regarding a failover target node that is in a running state is processed. At step 310, a determination is made as to whether a fault has occurred at the target node. If, it is determined that the fault has not occurred (option "NO") then the method 300 proceeds to step 312. At step 312, the method 300 waits for a fault to occur at the target node. If, at step 310, it is determined that the fault has occurred then the method 300 proceeds to step 314. At step 314, the application at the target node is brought offline. At step 316, the application is migrated to the failover target node. The method 300 proceeds to step 318, where the method 300 ends.

While the foregoing is directed to embodiments of the present invention, other and further embodiments of the invention may be devised without departing from the basic scope thereof, and the scope thereof is determined by the claims that follow.

The invention claimed is:

1. A method comprising:
   selecting a failover target node from a plurality of nodes, wherein
      the failover target node is configured to execute an application of a plurality of applications, and
      each of the plurality of applications is configured to be executed on at least one of the plurality of nodes;
   reserving a failover capacity of at least one resource at the failover target node, wherein
      the failover capacity is one of a plurality of failover capacities, and
      each of the plurality of failover capacities is associated with a corresponding one of the plurality of applications;
   consolidating the plurality of failover capacities;
   determining whether the consolidating results in none of the plurality of failover capacities being reserved on a first node of the plurality of nodes; and in response to determining that the consolidating results in none of the plurality of the failover capacities being reserved on the first node, releasing the first node.

2. The method of claim 1, further comprising:
determining whether the consolidating results in none of the plurality of applications executing on the first node, wherein
the releasing the first node is further performed in response to determining that the consolidating results in none of the plurality of applications executing on the first node.

3. The method of claim 1, wherein
the releasing results in the first node being powered down.

4. The method of claim 1, wherein
the failover target node is in a running state.

5. The method of claim 1, wherein
the reserving of the failover capacity is performed such that a disruption of a lower priority application at the failover target node is avoided.

6. The method of claim 1, wherein
the failover capacity does not exceed an available capacity of the at least one resource of the failover target node.

7. The method of claim 1, wherein
the application is configured to be failed over to the failover target node from a target node of the plurality of nodes, further comprising:
determining a reserved failover capacity, wherein
the reserved failover capacity is to be reserved on the failover target node.

8. The method of claim 7, further comprising:
detecting a failure in the target node; and
in response to the detecting the failure, failing over the application to the failover target node, wherein
the failing over uses the reserved failover capacity.

9. The method of claim 8, wherein failing over the application further comprises:
instructing the target node to offline the application; and
migrating the application to the failover target node.

10. The method of claim 1, further comprising:
monitoring the plurality of nodes, and
selecting another failover target node, wherein
the selecting causes the another failover target node to act as a replacement for the failover target node.

11. The method of claim 1, further comprising:
instructing at least one other node of the plurality of nodes to power down, wherein
at the time of the instructing, the at least one other node is not executing the application, and
the at least one other node is a one of the plurality of nodes other than the target node, and
the failover target node.

12. The method of claim 1, further comprising:
monitoring the plurality of nodes;
detecting an offlined application, wherein
the detecting is based on the monitoring; and
the consolidation is performed in response to detection of the offlined application.

13. An apparatus comprising:
datacenter software, wherein
the datacenter software is stored in a non-transitory memory, and
the datacenter software is configured to be executed by at least one processor to:
select a target node of a plurality of nodes in a datacenter to execute an application; and
a manager, wherein
the manager is stored in the non-transitory memory, the manager is configured to be executed by the at least one processor to:
upon execution of the application at the target node, select a failover target node from the plurality of nodes, wherein
the application is failed over to the failover target node upon detection of a failure in the target node,
the application is one of a plurality of applications, and
reserve a failover capacity of at least one resource at the failover target node, wherein
the failover capacity is one of a plurality of failover capacities, and
each of the plurality of failover capacities corresponds to a corresponding one of the plurality of applications,
consolidate the plurality of failover capacities,
determine whether the consolidation results in none of the plurality of failover capacities being reserved on a first node of the plurality of nodes, and
in response to determination that the consolidating results in none of the plurality of the failover capacities being reserved on the first node, release the first node.

14. The apparatus of claim 13, wherein
the manager is configured to be executed by the at least one processor further to:
determine whether the consolidating results in none of the plurality of applications executing on the first node, wherein
the release the first node is further performed in response to determination that the consolidating results in none of the plurality of applications executing on the first node.

15. The apparatus of claim 13, wherein
the manager is configured to be executed by the at least one processor further to:
detect an offline application, and
release a host computer by virtue of being further configured to consolidate a plurality of reserved failover capacities for a plurality of applications to free up the host computer.

16. The apparatus of claim 13, wherein
the release results in the first node being powered down.

17. A computer program product comprising:
a plurality of instructions, comprising
a first set of instructions, executable on a computer system, configured to select a failover target node from a plurality of nodes, wherein
the failover target node is configured to execute an application of a plurality of applications, and
each of the plurality of applications is configured to be executed on at least one of the plurality of nodes,
a second set of instructions, executable on the computer system, configured to reserve a failover capacity of at least one resource at the failover target node, wherein
the failover capacity is one of a plurality of failover capacities, and
each of the plurality of failover capacities is associated with a corresponding one of the plurality of applications,
a third set of instructions, executable on the computer system, configured to consolidate the plurality of failover capacities,
a fourth set of instructions, executable on the computer system, configured to determine whether the consolidation results in none of the plurality of failover capacities being reserved on a first node of the plurality of nodes, and a fifth set of instructions, executable on the computer system, configured to in response to determining that the consolidation results in none of the plurality of the failover capacities being reserved on the first node, release the first node; and a non-transitory computer-readable storage medium, wherein the instructions are encoded in the non-transitory computer-readable storage medium.

18. The computer program product of claim 17, wherein the plurality of instructions further comprise a sixth set of instructions that are executable on the computer system and are configured to:

determine whether the consolidating results in none of the plurality of applications executing on the first node, wherein the releasing the first node is further performed in response to determining that the consolidation results in none of the plurality of applications executing on the first node.

19. The computer program product of claim 17, wherein the release results in the first node being powered down.

20. The computer program product of claim 17, wherein the plurality of instructions further comprise a sixth set of instructions that are executable on the computer system and are configured to:

monitor the plurality of nodes, and the plurality of instructions further comprise a seventh set of instructions that are executable on the computer system and are configured to:

detect an offlined application, wherein the detecting is based on the monitoring, and the consolidation is performed in response to detection of the offlined application.

* * * * *